United States Patent
Sung

(10) Patent No.: US 9,131,646 B2
(45) Date of Patent: Sep. 15, 2015

(54) GREEN WALL PLANTING SUPPORT APPARATUS

(71) Applicant: Gerald Sung, Chiayi (TW)

(72) Inventor: Gerald Sung, Chiayi (TW)

( * ) Notice: Subject to any disclaimer, the term of this patent is extended or adjusted under 35 U.S.C. 154(b) by 150 days.

(21) Appl. No.: 13/785,809

(22) Filed: Mar. 5, 2013

(65) Prior Publication Data

US 2014/0109473 A1    Apr. 24, 2014

(30) Foreign Application Priority Data

Oct. 23, 2012   (TW) .............................. 101220435 U

(51) Int. Cl.
*A01G 25/02*    (2006.01)
*A01G 9/02*     (2006.01)

(52) U.S. Cl.
CPC .............. *A01G 9/025* (2013.01); *A01G 9/022* (2013.01); *A01G 9/024* (2013.01)

(58) Field of Classification Search
CPC ........ A01G 9/022; A01G 9/024; A01G 9/025
USPC ................ 47/65.9, 66.5, 82, 83, 67, 39
See application file for complete search history.

(56) References Cited

U.S. PATENT DOCUMENTS

| | | | | |
|---|---|---|---|---|
| 3,869,829 A * | 3/1975 | Chiosso | .............................. | 47/39 |
| 4,896,456 A | 1/1990 | Grant | ................................ | 47/67 |
| 6,098,337 A | 8/2000 | Chen | ................................ | 439/326 |
| 6,634,138 B2 * | 10/2003 | Katzman | ........................... | 47/79 |
| 7,788,848 B1 * | 9/2010 | Koumoudis | .................... | 47/65.9 |
| 8,281,517 B2 * | 10/2012 | MacKenzie | ........................ | 47/83 |
| 2007/0199241 A1 * | 8/2007 | Peleszezak | ..................... | 47/65.9 |
| 2009/0223126 A1 | 9/2009 | Garner | ............................... | 47/83 |
| 2011/0059518 A1 * | 3/2011 | Bribach et al. | ................. | 435/266 |
| 2011/0113685 A1 * | 5/2011 | Chang | ................................ | 47/39 |
| 2011/0146147 A1 * | 6/2011 | Irwin | ............................... | 47/66.5 |
| 2011/0225883 A1 * | 9/2011 | Clifford | ........................... | 47/82 |
| 2011/0252704 A1 * | 10/2011 | Cho | ................................. | 47/66.6 |
| 2011/0258925 A1 * | 10/2011 | Baker | .............................. | 47/65.8 |
| 2013/0152467 A1 * | 6/2013 | Chang | ................................ | 47/82 |
| 2014/0075840 A1 * | 3/2014 | Gosling et al. | ..................... | 47/81 |

FOREIGN PATENT DOCUMENTS

| | | | |
|---|---|---|---|
| FR | 2763488 | 11/1998 | |
| FR | 2939275 | 6/2010 | |
| FR | 2956946 | 9/2011 | |
| GB | 2487182 | 7/2012 | |
| JP | 2004254565 A * | 9/2004 | ............... A01G 9/02 |

(Continued)

OTHER PUBLICATIONS

Search Report for UK Patent Application No. GB1310405.4 dated Nov. 13, 2013.

*Primary Examiner* — Son T Nguyen

(74) *Attorney, Agent, or Firm* — Ladas & Parry, LLP

(57) ABSTRACT

A green wall planting support apparatus includes at least one plant support structure and a plurality of baskets. The plant support structure includes a vertical main plate that has a plurality of basket hanging portions. A water supply unit includes at least one main pipe connected to a water source, and a branch unit that is coupled to the main pipe and that has a plurality of watering conduits. Each basket has a basket body with a receiving space. The basket body has a basket hanger portion that is detachably connected to one of the basket hanging portions. The watering conduits convey water into the receiving spaces of the baskets, respectively.

2 Claims, 10 Drawing Sheets

(56) References Cited

FOREIGN PATENT DOCUMENTS

| | | | | |
|---|---|---|---|---|
| JP | 2006204205 A | * | 8/2006 | |
| JP | 2006296230 A | * | 11/2006 | |
| JP | 2008022750 A | * | 2/2008 | |
| JP | 2012090552 A | * | 5/2012 | |
| KR | 10-2013-0009331 | | 1/2013 | |
| WO | 2011/095570 | | 8/2011 | |

* cited by examiner

GREEN WALL PLANTING SUPPORT APPARATUS

CROSS-REFERENCE TO RELATED APPLICATION

This application claims priority from Taiwanese Application No. 101220435, filed on Oct. 23, 2012, the disclosure of which is incorporated herein by reference in its entirety.

BACKGROUND OF THE INVENTION

1. Field of the Invention

The invention relates to a green wall planting support apparatus, more particularly to a green wall planting support apparatus adapted for standing-up growth of plants.

2. Description of the Related Art

FIG. 1 illustrates a conventional green wall planting support apparatus 1 that is mounted on a wall 10 through a plurality of fasteners 14. The conventional green wall planting support apparatus 1 includes a plastic main plate 11 that has a plurality of circular holes 111, a plurality of plastic plant baskets 12, and a plurality of hooks 13 that detachably engage the plant baskets 12 with the main plate 11. Each plant basket 12 has a surrounding wall 121 that defines a plant-receiving space 120 and that has two spaced-apart hook holes 122. Each hook 13 has two opposite hook portions. Each of the two hook holes 122 of the plant basket 12 is hooked with one of two hook portions of a corresponding one of the hooks 13. The other of the two hook portions of the corresponding one of the hooks 13 is hooked in the corresponding one of the circular holes 111 of the main plate 11.

During use of the conventional green wall planting support apparatus 1, aside from a weight of the plant, each plant basket 12 has to bear weights of soil and water. The weights borne by the plant baskets 12 act on the periphery of the circular holes 111 of the main plate 11 and the periphery of the hook holes 122 of the plant baskets 12 through the hooks 13 hooked therein. Since stresses caused by the weights of plants, soil and water are concentrated on the periphery of the circular holes 111 of the main plate 11 and the periphery of the hook holes 122 of the plant baskets 12, and since the main plate 11 and the plant baskets 12 are made from a plastic material having a relatively poor weather durability, the main plate 11 and the plant baskets 12 tend to be damaged after a long term of use due to cracking of the periphery of the circular holes 111 of the main plate 11 and the periphery of the hook holes 122 of the basket 12.

On the other hand, the conventional green wall planting support apparatus 1 merely provides space for placing plants. The plant baskets 12 with plants mounted on the main plate 11 are spaced apart from each other in a row. For watering the plants, the plant baskets 12 are needed to be watered respectively. When watering is excessive, superfluous water may flow out of bottoms of the plant baskets 12. As a result, the conventional green wall planting support apparatus 1 suffers from the problems of inconvenience in watering, failure in recycling the superfluous water and soiling of the environment.

SUMMARY OF THE INVENTION

Therefore, an object of the present invention is to provide a green wall planting support apparatus that can overcome the aforesaid drawbacks of the prior art.

According to the present invention, a green wall planting support apparatus is adapted for connecting to a water source and includes at least one plant support structure and a plurality of baskets. The plant support structure includes a vertical main plate and a water supply unit for connecting to the water source. The vertical main plate has a plurality of basket hanging portions. The water supply unit includes at least one main pipe that is to be connected to the water source, and a branch unit that is coupled to the main pipe. The branch unit has a plurality of watering conduits. Each of the baskets has a basket body. The basket body has a receiving portion that defines a receiving space and a basket hanger portion that is detachably connected to one of the basket hanging portions. The watering conduits convey water into the receiving spaces of the baskets, respectively.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
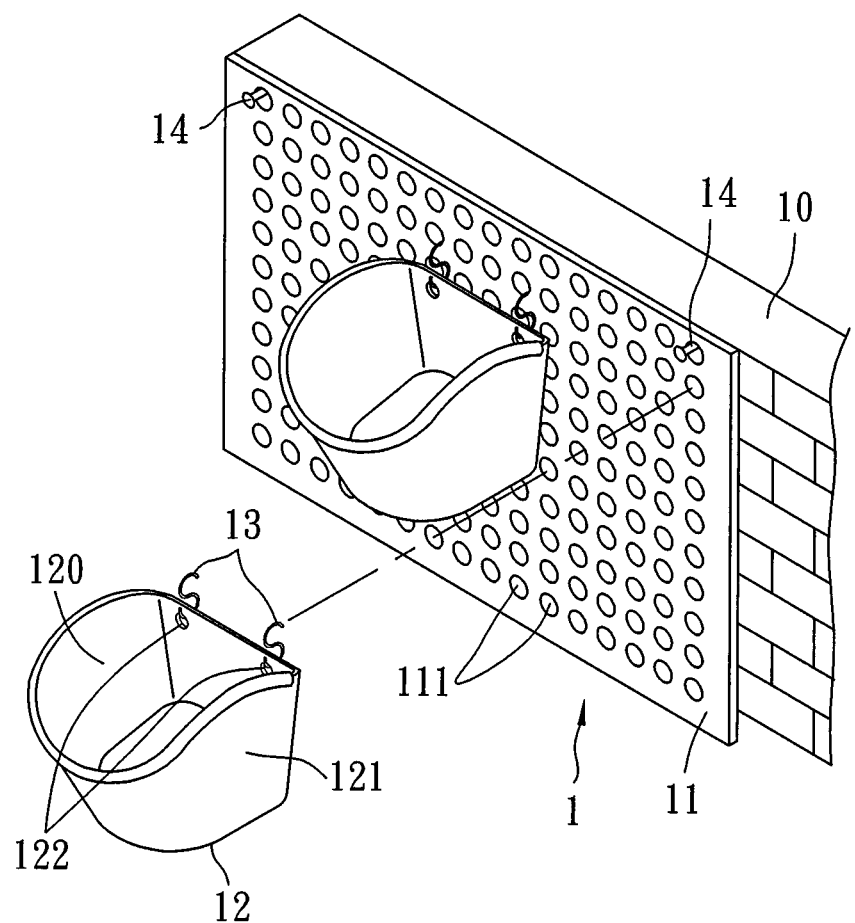
FIG. 1 is a perspective view, illustrating a conventional green wall planting support apparatus.

Before the present invention is described in greater detail, it should be noted that like elements are denoted by the same reference numerals throughout the disclosure.

Figure 2:
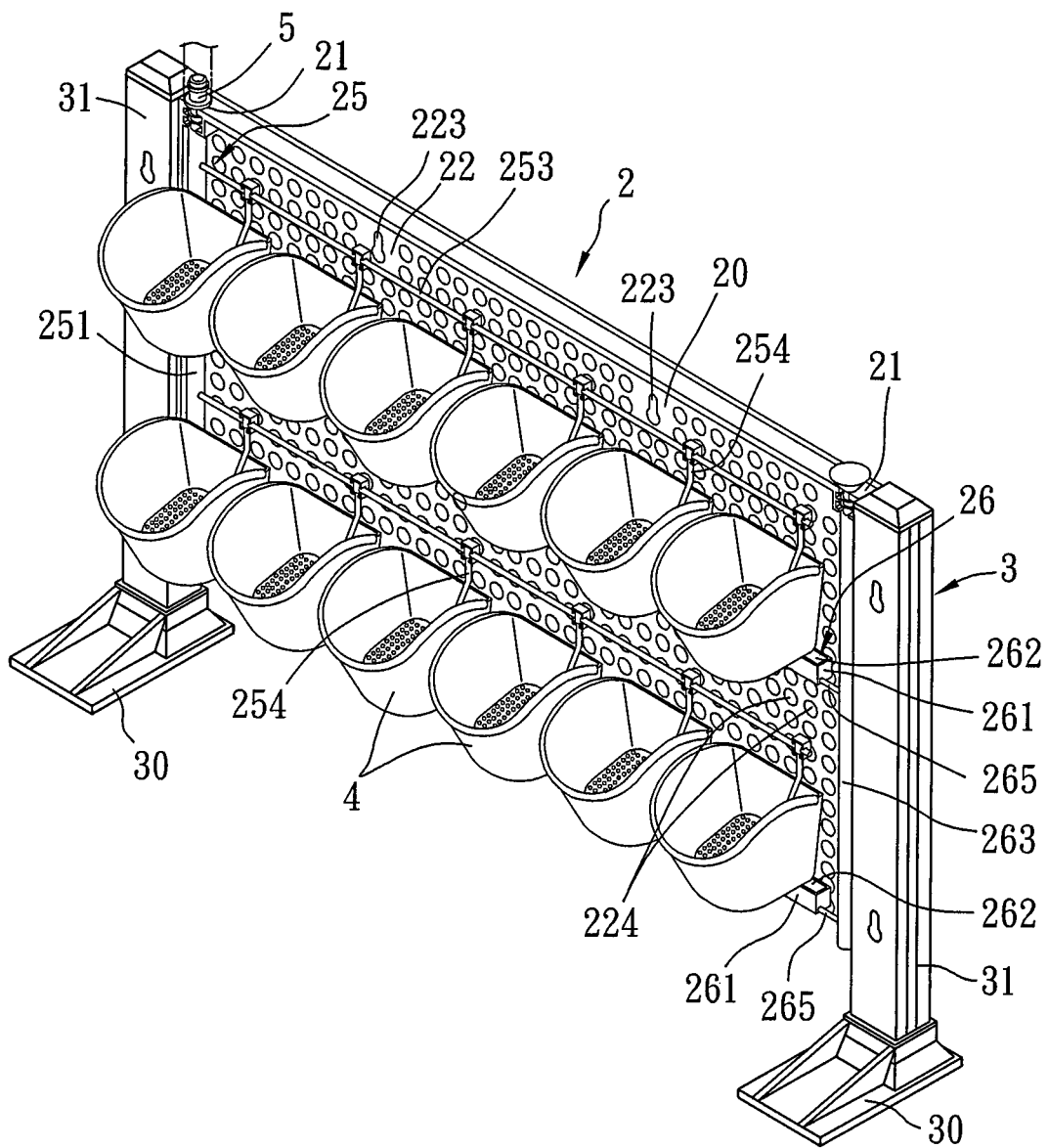
FIG. 2 is a perspective view, illustrating the first preferred embodiment of a green wall planting support apparatus according to the present invention.
Figure 3:
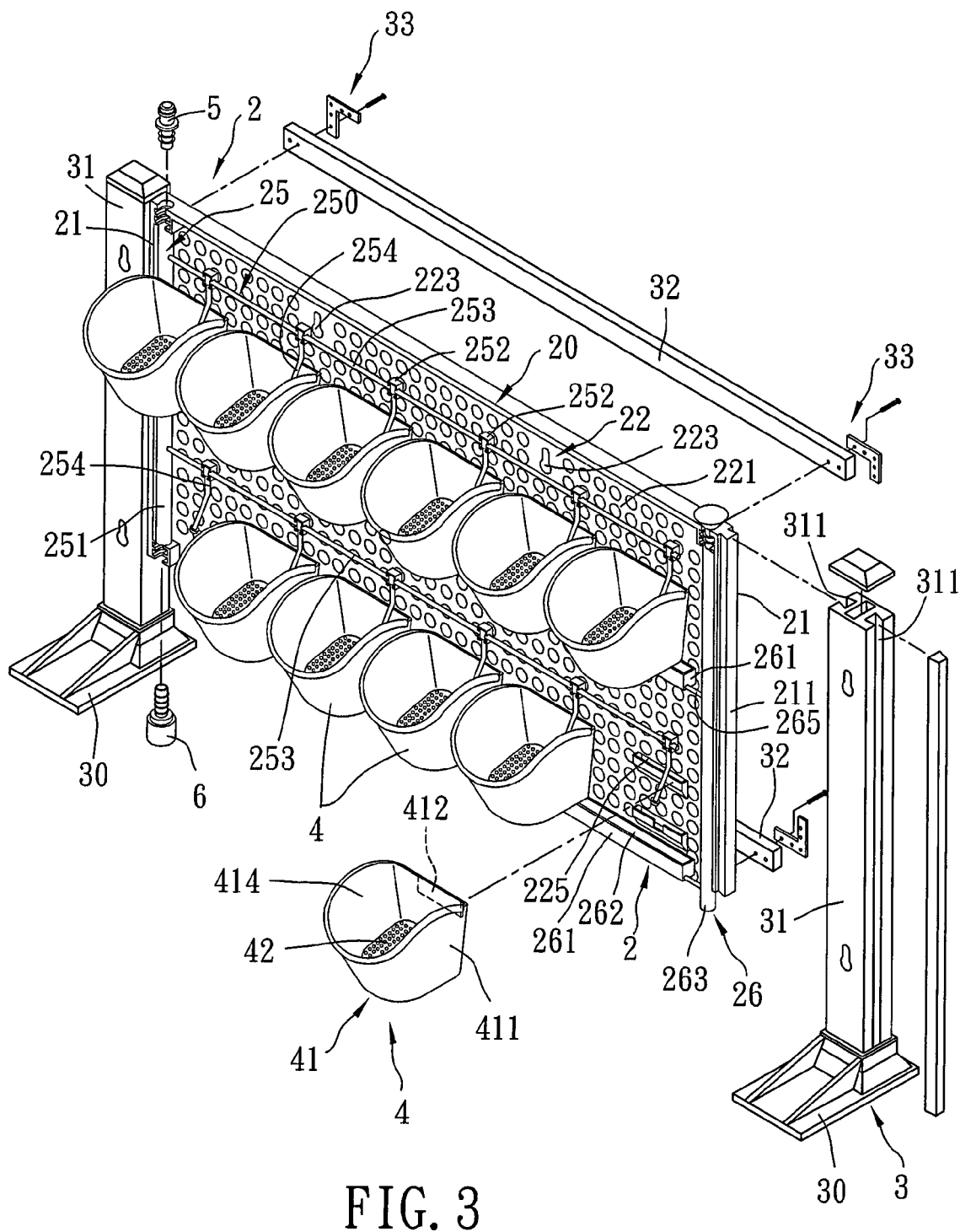
FIG. 3 is an exploded perspective view of the first preferred embodiment.
Figure 4:
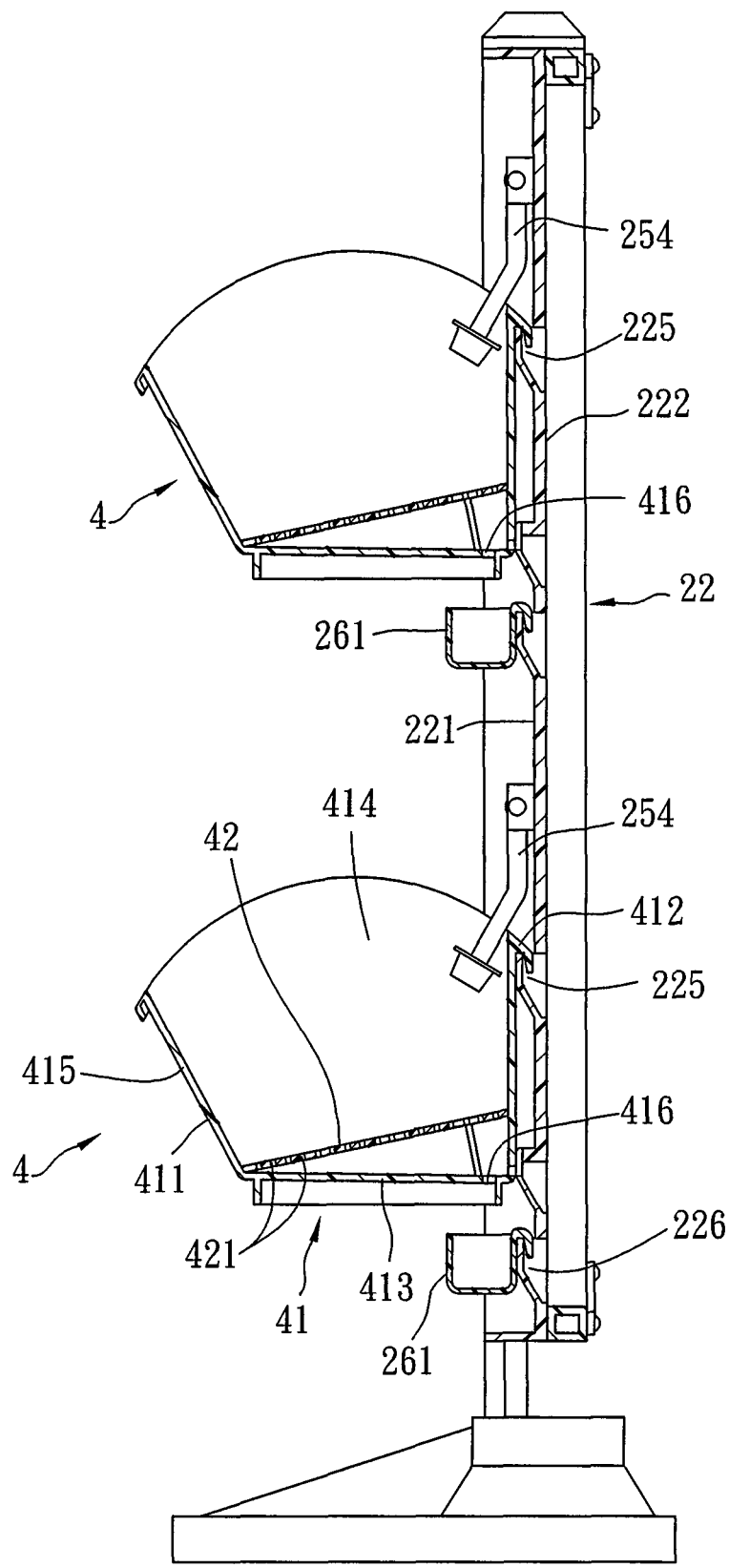
FIG. 4 is a sectional view of the first preferred embodiment.

Referring to FIGS. 2 to 4, the first preferred embodiment of a green wall planting support apparatus according to the present invention is adapted for planting plants in a standing-up manner and is adapted for connecting to a water source. The green wall planting support apparatus includes at least one plant support structure 2 and a plurality of baskets 4.

In this embodiment, the green wall planting support apparatus includes one plant support structure 2. The plant support structure 2 includes a vertical main plate 20 and a water supply unit 25 for connecting to the water source. The vertical main plate 20 is integrally formed from a plastic material and has a plurality of basket hanging portions 225. Preferably, the vertical main plate 20 further has two spaced-apart insertion parts 21, and a mounting part 22 that interconnects the insertion parts 21 and that is formed with the basket hanging portions 225. Each of the insertion parts 21 has a vertical insertion rod 211. The mounting part 22 has a front vertical side 221, a rear vertical side 222, a plurality of wall hanging holes 223 that pass through the front and rear vertical sides 221, 222, a plurality of mounting holes 224 that pass through the front and rear vertical sides 221, 222, and a plurality of receptacle hanging portions 226 that respectively support a liquid receptacle 261 (which will be described in detail hereinafter). In this embodiment, the basket hanging portions 225 are spaced apart, formed in two horizontal rows, and are vertically aligned. The receptacle hanging portions 226 have an arrangement similar to the basket hanging portions 225 and each of the receptacle hanging portions 226 is disposed beneath a corresponding one of the basket hanging portions 225. However, the basket hanging portions 225 and the receptacle hanging portions 226 are not limited to be arranged in two horizontal rows, respectively. The basket hanging portions 225 and the receptacle hanging portions 226 may be arranged in one horizontal row or a plurality of horizontal rows, respectively.

The water supply unit 25 includes at least one main pipe 251. In this embodiment, the water supply unit 25 includes one main pipe 251 vertically formed adjacent to the mounting portion 22 of the main plate 20 and a branch unit 250 that is coupled to the main pipe 251. The branch unit 250 has a plurality of watering conduits 254. The watering conduits 254 extend to the front vertical side 221 of the main plate 20. The green wall planting support apparatus further includes a seal member 6 that is disposed on a bottom end of the main pipe 251 so as to prevent water from leaking out of the main pipe 251. More preferably, the green wall planting support apparatus further includes a water inlet connector 5 that is disposed on a top end opposite to the bottom end of the main pipe 251 and that is connected to the water source. The branch unit 250 of the water supply unit 25 has at least one watering branch conduit 253 that is connected to one of the watering conduits 254. In this embodiment, the branch unit 250 has two watering branch conduits 253 parallel with each other. Each watering branch conduit 253 is connected to corresponding ones of the water conduits 254. The water supply unit 25 further has a plurality of fasteners 252 for respectively securing the watering branch conduits 253 to the main plate 20. In this embodiment, the fasteners 252 respectively secure the watering branch conduits 253 through the mounting holes 224 on the main plate 20.

Preferably, the plant support structure 2 further includes a recycle unit 26 that is disposed on the main plate 20. The recycle unit 26 has at least one liquid receptacle 261 that is attached to the main plate 20 and that has a liquid space 262. In this embodiment, the recycle unit 26 has two liquid receptacles 261 that are supported by the receptacle hanging portions 226, respectively. Each liquid receptacle 261 of the recycle unit 26 is mounted on the front vertical side 221 of the mounting part 22 of the main plate 20. The liquid space 262 of each liquid receptacle 261 opens upwardly relative to ground. In addition, the recycle unit 26 includes a main drain tube 263 that is opposite to the main pipe 251 of the water supply unit 25 and that is vertically disposed adjacent to the mounting portion 22, and two guide drain conduits 265 that respectively interconnect the liquid receptacles 261 and the main drain pipe 263.

Preferably, the green wall planting support apparatus further includes a pedestal unit 3 that vertically supports the plant support structure 2. The pedestal unit 3 includes two spaced-apart main vertical posts 31. Each of the main vertical posts 31 has a slit 311 that receives the insertion rod 211 of a corresponding one of the insertion parts 21. In addition, the pedestal unit 3 includes two seats 30 that respectively connect bottom ends of the main vertical posts 31 and that respectively have increased areas in contact with the ground. Preferably, the pedestal unit 3 further includes a plurality of horizontal connection plates 32, and a plurality of connection members 33 each of which secures one of the horizontal connection plats 32 to a corresponding one of the main vertical posts 31. The main plate 20 may be supported in air by means of support provided by the main vertical posts 31 and the connections among the main vertical posts 31, the horizontal connection plats 32, and the connection members 33. Alternatively, the main plate 20 may be hung on a wall (not shown) through the wall hanging holes 223, i.e., the pedestal unit 3 may be omitted from the green wall planting support apparatus of the present invention.

The baskets 4 are disposed on the front vertical side 221 of the mounting part 22 of the main plate 20. Each of the baskets 4 has a basket body 41. The basket body 41 has a receiving portion 411 that defines a receiving space 414 for receiving the plant, and a basket hanger portion 412 that is detachably connected to one of the basket hanging portions 225 of the main plate 20 and that extends integrally and outwardly from a side of the receiving portion 411. Preferably, the basket body 41 of each of the baskets 4 further has a drainage hole 416 that communicates with the receiving space 414 and that drains liquid from the receiving space 414 to the liquid space 262.

In addition, the basket body 41 further includes a basket base wall 413, and a basket surrounding wall 415 that extends upwardly from and cooperates with the basket base wall 413 to define the receiving space 414. In this embodiment, one of the basket base wall 413 and the basket surrounding wall 415 has the drainage hole 416. Each of the baskets 4 further includes an inclined plate 42 that is disposed above the basket base wall 413 and that is inclined upwardly and rearward from a front side of the basket base wall 413 for tilting downwardly and forwardly plants disposed inside the basket body 41. The inclined plate 42 has a plurality of through holes 421 formed thereon. In this case, the basket hanger portion 412 extends outwardly and downwardly from a top of the basket surrounding wall 415.

During use of the green wall planting support apparatus of the present invention, the plant support structure 2 may either be hung on the wall (no shown) through the wall hanging holes 223 or with reference to FIGS. 2, 3 and 4, the pedestal unit 3 may be used to support the plant support structure 2 on the ground. In actual implementation, the vertical insertion rods 211 of the main plate 20 are respectively inserted into the slits 311 of the vertical posts 31. The horizontal connection plates 32 are secured between the main vertical posts 31 through the connection members 32, such that the plant support structure 2 and the pedestal unit 3 may be configured as a rigid structure body. Then, the baskets 4 are mounted on the main plate 20 through a detachable connection between the basket hanger portions 412 of the baskets body 41 and the basket hanging portions 225 of the main plate 20. Afterwards, the main pipe 251 may supply water through the water inlet connector 5 connected to the water source and the seal member 6 sealing the bottom of the main pipe 251.

When water flows into the main pipe 251 of the water supply unit 25, since the two watering branch conduits 253 are connected to the watering conduits 254, the watering conduits 254 convey water into the receiving spaces 414 of the baskets 4, respectively. When water is excessively supplied, the drainage hole 416 of each basket 4 drains liquid from the receiving space 414 to the liquid space 262 of the liquid receptacle 261. Since the two guide drain conduits 265 interconnect the liquid receptacles 261 and the main drain pipe 263, superfluous water may be transported into the main drain pipe 263 through the drain guide conduits 265. In order to prevent superfluous liquid from spilling out, a bucket (not shown) may be disposed beneath the main drain pipe 263, or superfluous liquid may be deflected into a gutter (not shown) through a drainage tube (not shown) connected to the main drain pipe 263.

Therefore, the green wall planting support apparatus of the present invention may not only support standing-up growth of plants, but may also have water supply to irrigate plants and maintain a clean environment. In this embodiment, the basket hanger portion 412 of each basket 4 and a corresponding one of the basket hanging portions 225 of the main plate 20 are elongated and designed for connection with each other so as to enhance the connection strength of the baskets 4 and the main plate 20 and so as to avoid concentration of stress and damage of the green wall planting support apparatus caused thereby.

Figure 5:
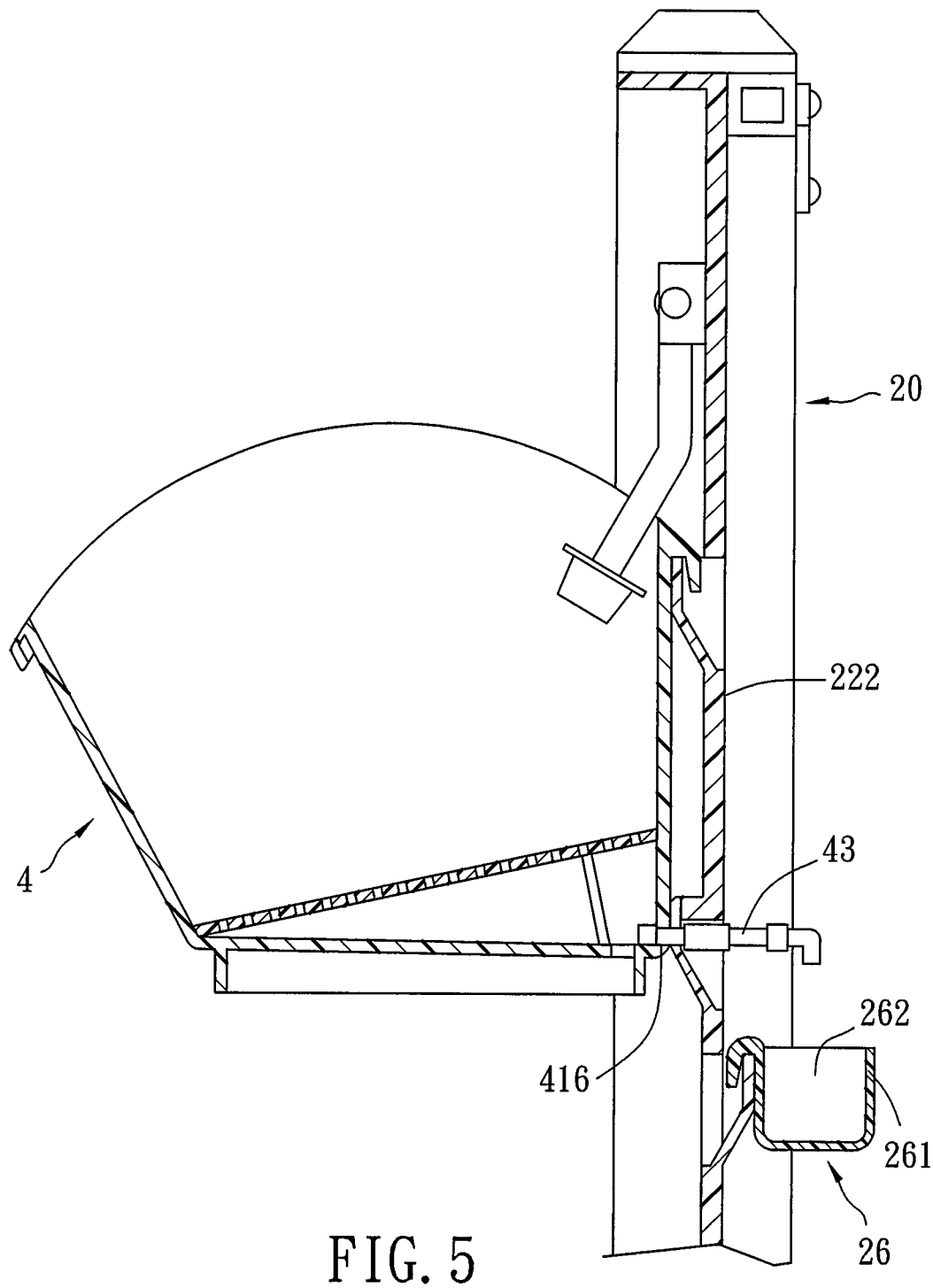
FIG. 5 is a fragmentary sectional view, illustrating the second preferred embodiment of a green wall planting support apparatus according to the present invention.

FIG. 5 shows the second preferred embodiment of a green wall planting support apparatus according to this invention, which has a structure generally similar to that of the first preferred embodiment. However, the liquid receptacle 261 of the recycle unit 26 is mounted on the rear vertical side 222 of the main plate 20. Each of the baskets 4 further includes a draining tube 43 that is connected to the drainage hole 416 and that drains liquid into the liquid space 262 of the liquid receptacle 261. Since the liquid receptacle 261 is hidden behind the main plate 20, the front vertical side 221 of the main plate 20 may have an improved aesthetic appearance.

Figure 6:
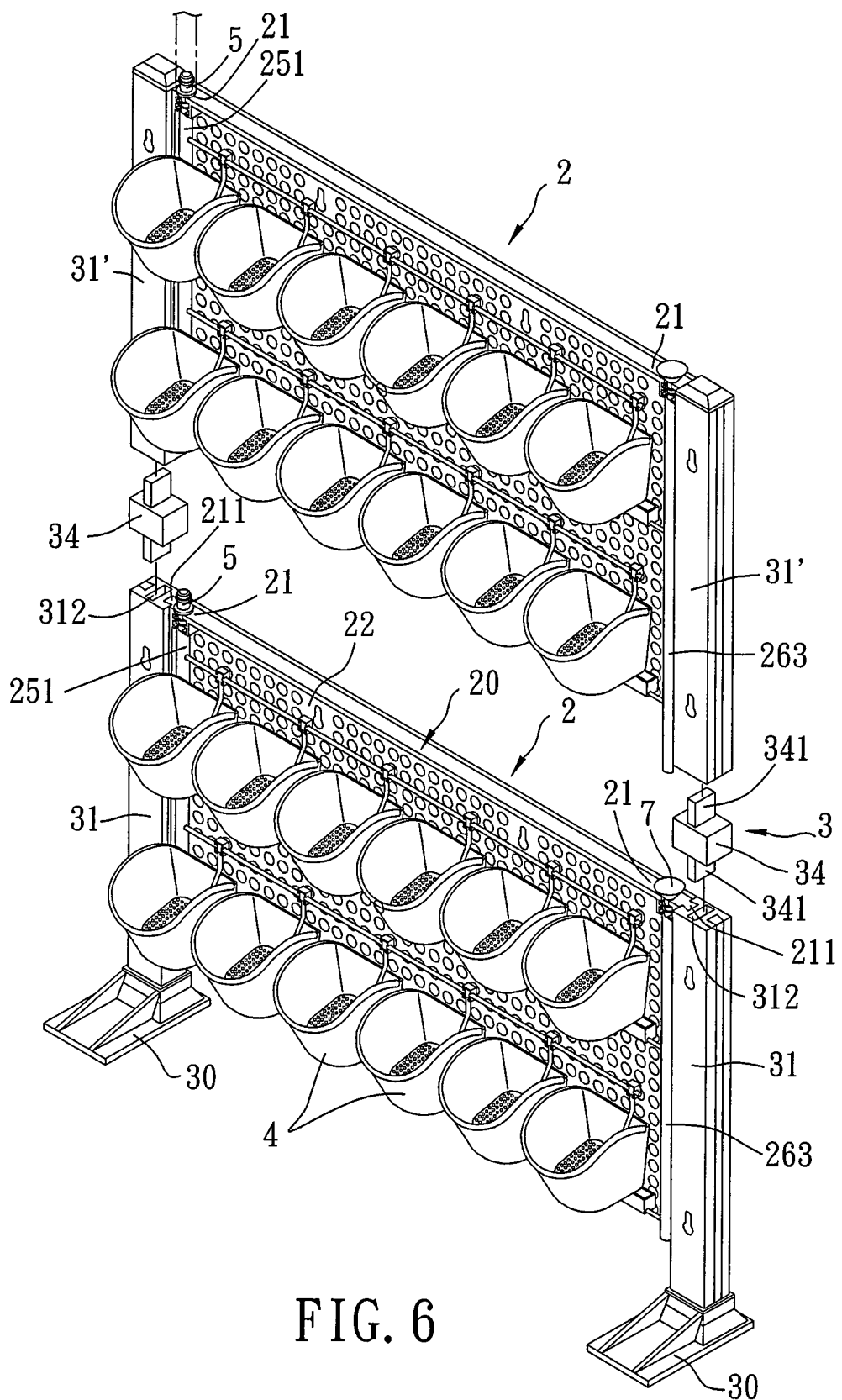
FIG. 6 is an exploded perspective view, illustrating the third preferred embodiment of a green wall planting support apparatus according to the present invention.

FIG. 6 shows the third preferred embodiment of a green wall planting support apparatus according to this invention. In this embodiment, the green wall planting support apparatus includes two spaced-apart plant support structures 2 aligned with each other in a vertical direction, a plurality of baskets 4, and a pedestal unit 3 for supporting and connecting the plant support structures 2. The main plate 20 of each of the plant support structures 2 further has two spaced-apart insertion parts 21, and a mounting part 22 that interconnects the insertion parts 21 and that is formed with the basket hanging portions 225. Each of the insertion parts 21 has a vertical insertion rod 211. The pedestal unit 3 includes two spaced-apart first vertical posts 31 that are respectively connected to two opposite sides of a lower one of the plant support structures 2, two seats 30 that are respectively connected to bottom ends of the first vertical posts 31, two spaced-apart second vertical posts 31' that are respectively connected to two opposite sides of an upper one of the plant support structures 2, and two post connectors 34 each of which interconnects one of the first vertical posts 31 and one of the second vertical posts 31'. Each of the first and second vertical posts 31, 31' has two opposite slits 311 that respectively receive the insertion rods 211 of the plant support structures 2. In addition, each of the first and second vertical posts 31, 31' further has a pair of connecting insertion holes 312. The two pairs of connecting insertion holes 312 of the first and second vertical posts 31, 31' are opposite to each other in a vertical direction. Each of two post connectors 34 has two opposite insertion plates 341 that are respectively inserted into the connecting insertion holes 312 of the first and second vertical posts 31, 31'. By virtue of a connection among the post connectors 4 and the first and second vertical posts 31, 31', the number of the plant structures 2 may be varied in the vertical direction according to an actual requirement. Preferably, the pedestal unit 3 further includes a plurality of horizontal connection plates 32, and a plurality of connection members 33 each of which secures one of the horizontal connection plates 32 to a corresponding one of the first and second vertical posts 31, 31'.

In this embodiment, the green wall planting support apparatus further includes two water inlet connectors 5 that are respectively disposed on top ends of the main pipes 251 of the plant support structures 2, and a funnel 7 that is disposed on a top end of the lower one of the plant support structures 2. The funnel 7 interconnects the main drain tubes 263 of the plant support structures 2. One of the water inlet connectors 5 interconnects the main pipes 251 of the plant support structures 2. The other one of the water inlet connectors 5 is connected to the water source. Accordingly, the water can be conveyed to the baskets 4 through the water inlet connectors 5 and the superfluous water can be drained out from the upper to the lower plant structures 2 through the funnel 7.

Figure 7:
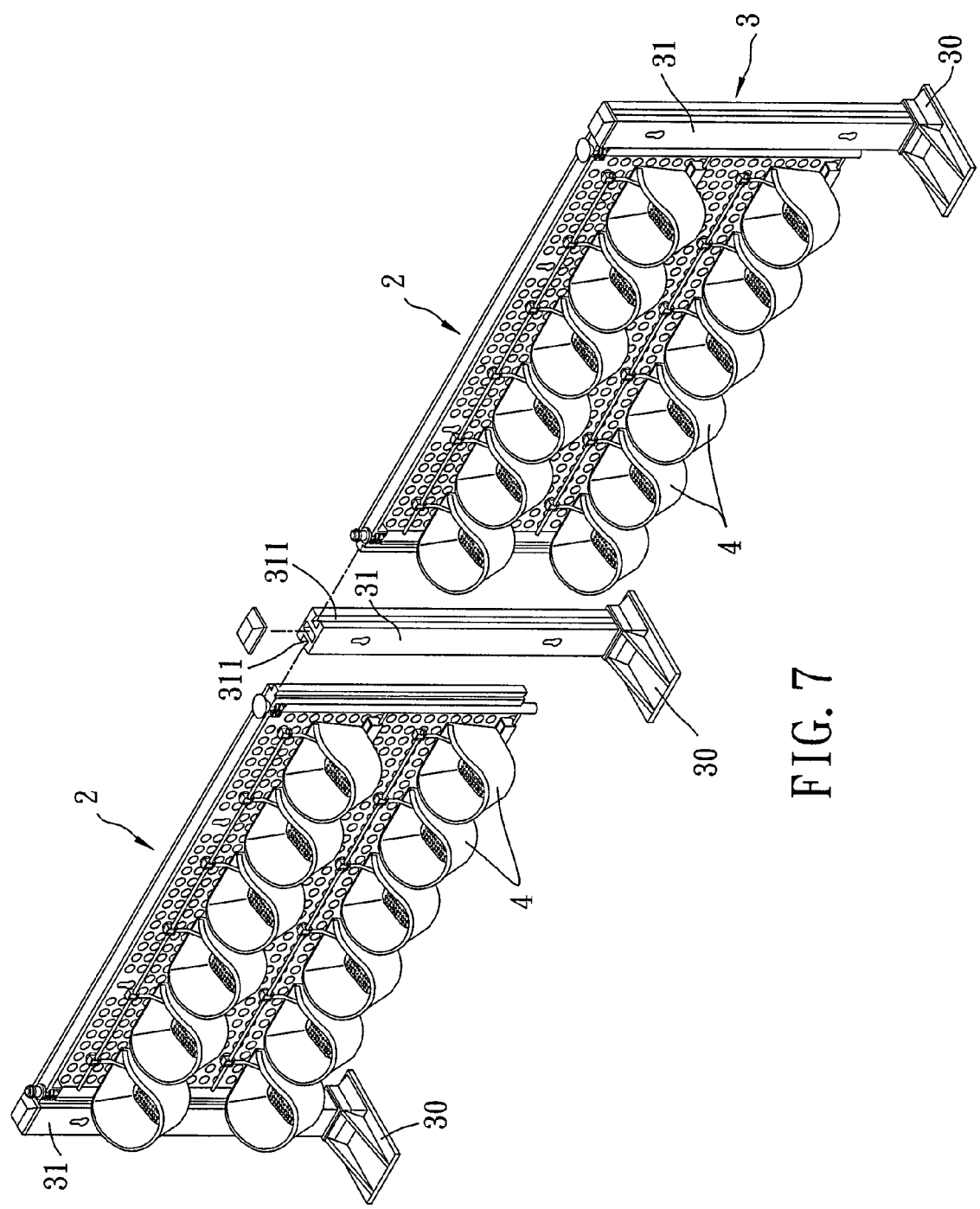
FIG. 7 is a perspective exploded view, illustrating the fourth preferred embodiment of a green wall planting support apparatus according to the present invention.

FIG. 7 shows the fourth preferred embodiment of a green wall planting support apparatus according to this invention. In this embodiment, the green wall planting support apparatus includes two spaced-apart plant support structures 2 aligned with each other in a horizontal direction, a pedestal unit 3, and a plurality of baskets 4. The main plate 20 of each of the plant support structures 2 further has two spaced-apart insertion parts 21, and a mounting part 22 that interconnects the insertion parts 21 and that is formed with the basket hanging portions 225. Each of the insertion parts 21 has a vertical insertion rod 211. The pedestal unit 3 includes three spaced-apart main vertical posts 31, and three seats 30 that are respectively connected to bottom ends of the main vertical posts 31. The main plate 20 of each of the plant support structures 2 is disposed between two adjacent ones of the main vertical posts 31. Each of the main vertical posts 31 has two opposite slits 311 that respectively receive the insertion rods 211 of a corresponding one of the insertion parts 21. By virtue of such connection among the main vertical posts 31 and the plant support structures 2, the green wall may be flexibly extended in the horizontal direction.

Figure 8:
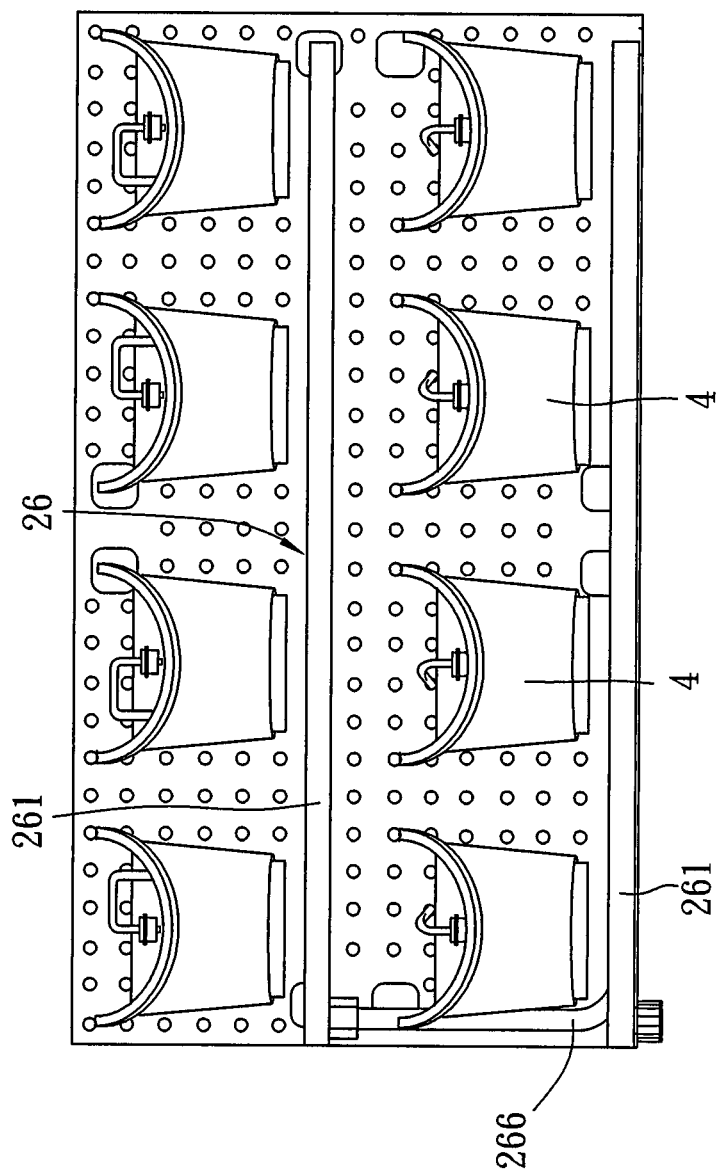
FIG. 8 is a front view, illustrating the fifth preferred embodiment of a green wall planting support apparatus according to the present invention.

FIG. 8 shows the fifth preferred embodiment of a green wall planting support apparatus according to this invention, which has a structure generally similar to that of the first preferred embodiment. However, in this embodiment, the two liquid receptacles 261 are beneath the two horizontal rows of the baskets 4, respectively. The recycle unit 26 further has a connection tube 266 that interconnects the two liquid receptacles 261 in the vertical direction. The connection tube 266 may drain superfluous water from an upper one of the horizontal rows of the two liquid receptacles 261 to a lower one of the horizontal rows of the two liquid receptacles 261.

Figure 9:
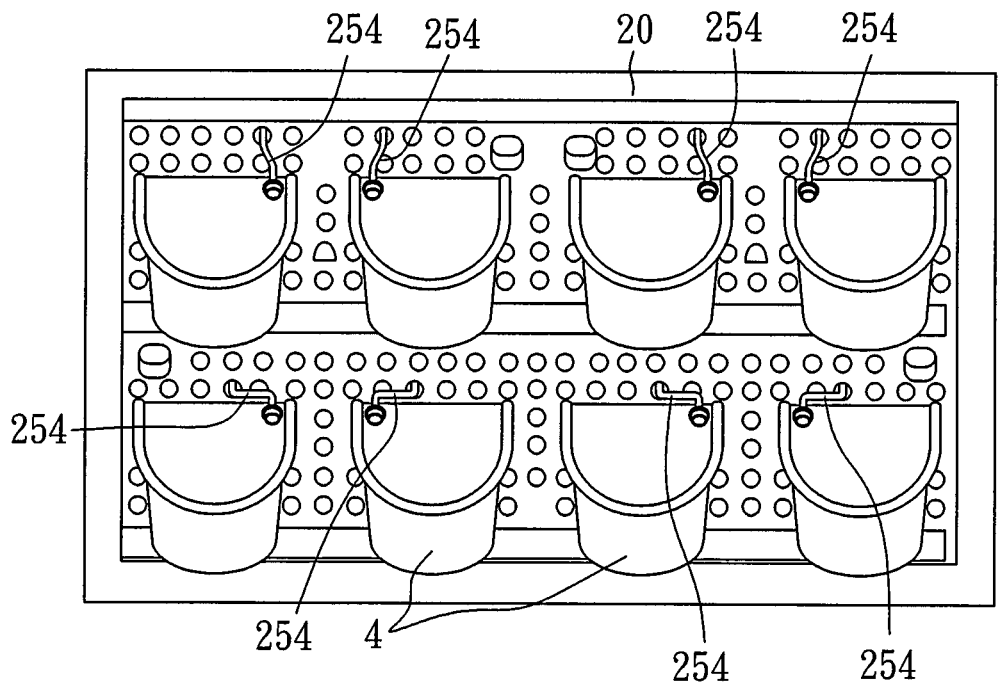
FIG. 9 is a front view, illustrating the sixth preferred embodiment of a green wall planting support apparatus according to the present invention.
Figure 10:
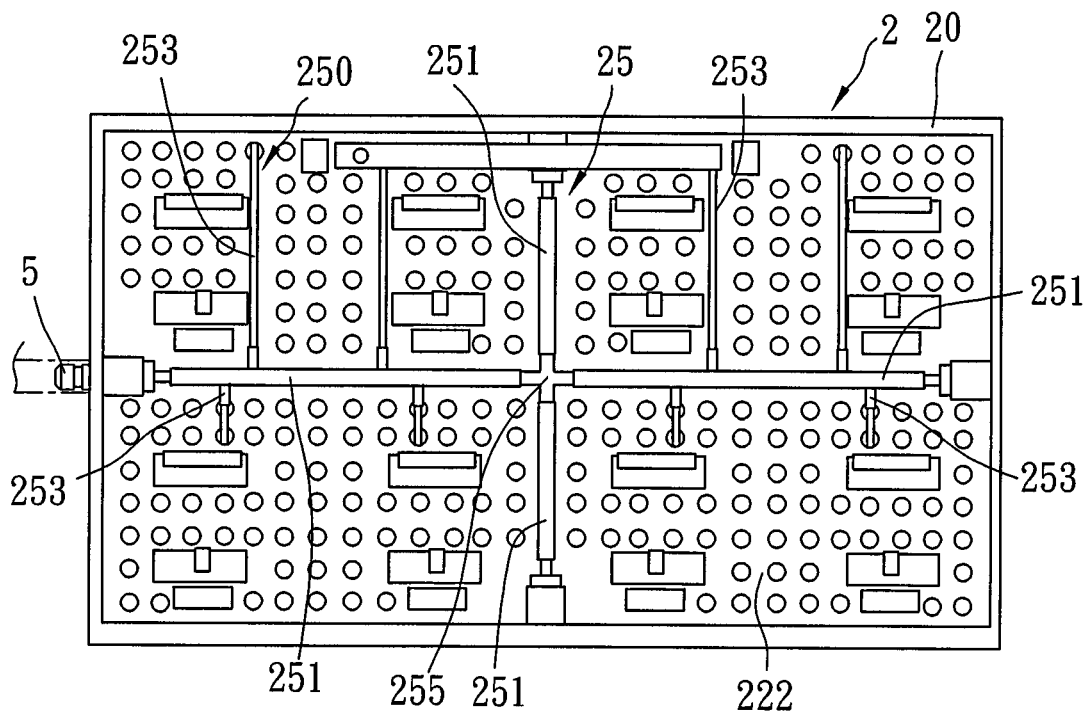
FIG. 10 is a rear view of the sixth preferred embodiment.

FIGS. 9 and 10 show the sixth preferred embodiment of a green wall planting support apparatus according to this invention, which has a structure generally similar to that of the first preferred embodiment. However, the water supply unit 25 is disposed behind the main plate 20 and has four main pipes 251 that are mounted on the rear vertical side 222 of the main plate 20 and that are arranged in a cross shape, and a multi-way connector 255 that interconnects the four main pipes 251. In this embodiment, the branch unit 250 further has a plurality of watering branch conduits 253 that are mounted on the rear vertical side 222 of the main plate 20. Each of the watering branch conduits 253 is connected to one of the main pipes 251 and one of the watering conduits 254, such that water is conveyed to the baskets 4 through the watering conduits 254. In this embodiment, each main pipe 251 has an inlet end and an outlet end that is opposite to the inlet end. The outlet end of one of the main pipes 251 is connected to the multi-way connector 225 and the inlet end of the one of the main pipes 251 is connected to the water inlet connector 5 for connecting the water source. Each of the other three of the main pipes 251 has the inlet end that is connected to the multi-way connector 255, and has an autoblock connector (not shown) that is disposed in the outlet end thereof. Instead of the seal member 6, the autoblock connector may prevent water from flowing out of the outlet end of the corresponding one of the main pipes 251.

In the sixth preferred embodiment, since the water supply unit 25 is disposed on the rear vertical side 222 of the main plate 20, the water supply unit 25 may be hidden, so that the front vertical side 221 of the main plate 20 may have an improved aesthetic appearance.

Figure 11:
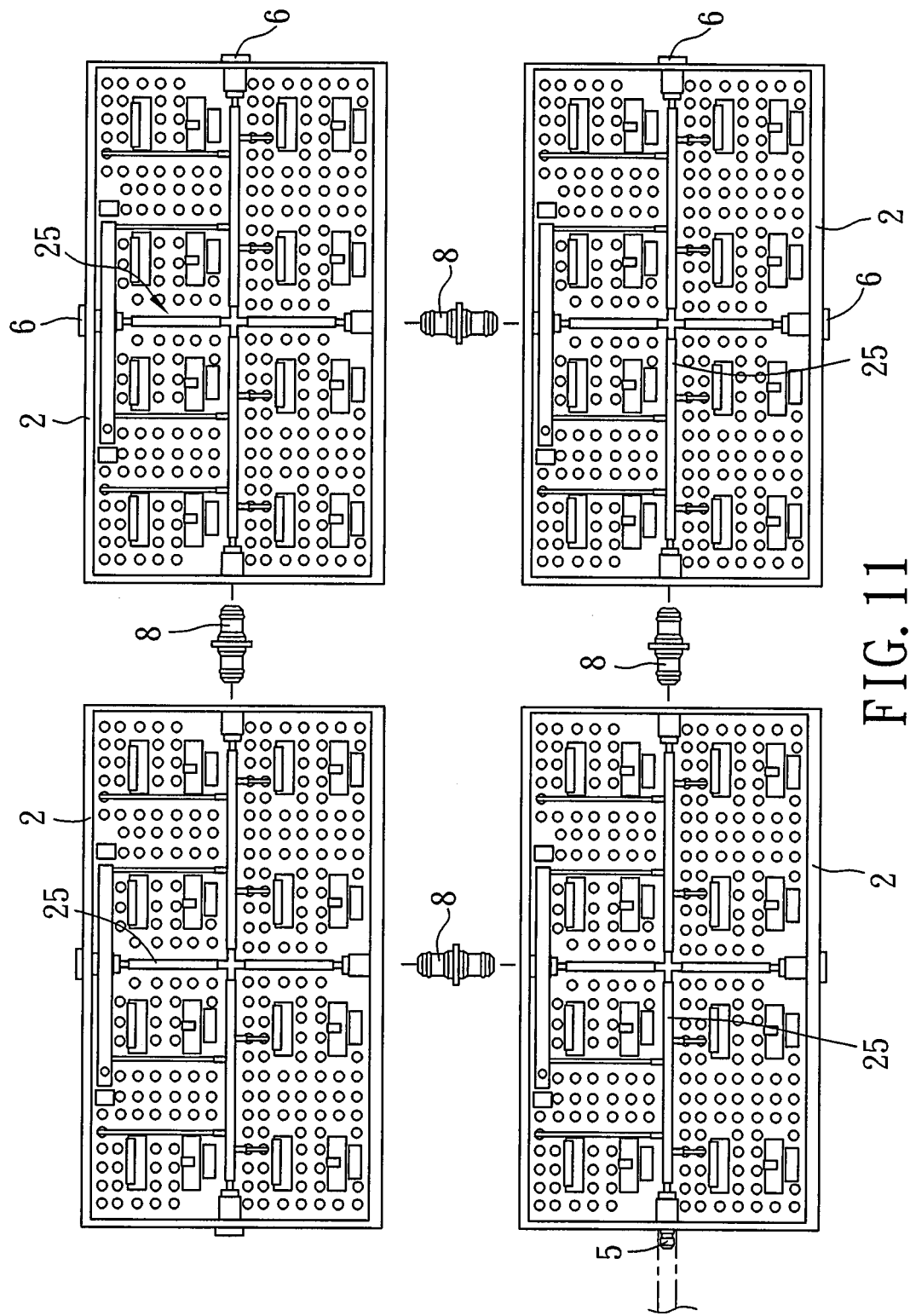
FIG. 11 is an exploded rear view, illustrating the seventh preferred embodiment of a green wall planting support apparatus according to the present invention.

FIG. 11 shows the seventh preferred embodiment of a green wall planting support apparatus according to this invention, which has a structure generally similar to that of the sixth preferred embodiment. However, the green wall planting support apparatus includes a plurality of the plant support structures 2, a plurality of seal members 6, and a water inlet connector 5. Preferably, the green wall planting support apparatus further includes a plurality of series connectors 8. Each of the series connectors 8 interconnects fluidly the water supply units 25 of two adjacent ones of the plant support structures 2. By virtue of connections among the series connector 8 and the water supply units 25, the number of the plant support structures 2 may be varied in the vertical and horizontal directions with sufficient and convenient water supply. In this embodiment, the autoblock connectors may be substituted for the seal members 6 for ease of assembling.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A green wall planting support apparatus adapted for connecting to a water source, comprising:
   at least one plant support structure that includes a vertical main plate and a water supply unit for connecting to the water source, said vertical main plate having a plurality of basket hanging portions, said water supply unit including at least one main pipe to be connected to the water source, and a branch unit coupled to said main pipe, said branch unit having a plurality of watering conduits; and
   a plurality of baskets each having a basket body, said basket body having a receiving portion that defines a receiving space, and a basket hanger portion that is detachably connected to one of said basket hanging portions,
   wherein said watering conduits convey water into said receiving spaces of said baskets, respectively,
   wherein said baskets are disposed on a front vertical side of said main plate, said watering conduits extending to said front vertical side of said main plate, said plant support structure further including a recycle unit disposed on said main plate, said recycle unit having at least one liquid receptacle that is attached to said main plate and that has a liquid space, said basket body of each of said baskets further having a drainage hole that communicates with said receiving space and that drains liquid from said receiving space to said liquid space,
   wherein said water supply unit has four main pipes that are mounted on a rear vertical side of said main plate and that are arranged in a cross shape, and a multi-way connector that interconnects said four main pipes, said branch unit further having a plurality of watering branch conduits that are mounted on said rear vertical side of said main plate, each of said watering branch conduits being connected to one of said main pipes and one of said watering conduits,
   wherein said green wall planting support apparatus further comprises a plurality of said plant support structures, and which further comprises a plurality of series connectors, each of said series connectors interconnecting fluidly said water supply units of two adjacent ones of said plant support structures and wherein said basket body further includes a basket base wall, and a basket surrounding wall that extends upwardly from and cooperates with said basket base wall to define said receiving space, one of said basket base wall and said basket surrounding wall having said drainage hole, each of said baskets further including an inclined plate that is disposed above said basket base wall and that is inclined upwardly and rearward from a front side to a rear side of said basket base wall for tilting downwardly and forwardly plants disposed inside said basket body, said inclined plate having a plurality of through holes formed thereon.

2. The green wall planting support apparatus as claimed in claim 1, wherein said branch unit of said water supply unit has at least one watering branch conduit that is connected to one of said watering conduits, said water supply unit further having a plurality of fasteners fastening said watering branch conduit to said main plate, said main plate further having a plurality of receptacle hanging portions that support said liquid receptacle.

\* \* \* \* \*